United States Patent
Schutte

[19]

[11] Patent Number: 6,038,623
[45] Date of Patent: Mar. 14, 2000

[54] ELECTRONIC NETWORK ALLOWING MULTI-SPEED COMMUNICATION

[75] Inventor: Herman Schutte, Eindhoven, Netherlands

[73] Assignee: U.S. Philips Corporation, New York, N.Y.

[21] Appl. No.: 09/015,882

[22] Filed: Jan. 29, 1998

[30] Foreign Application Priority Data

Jan. 30, 1997 [EP] European Pat. Off. ............. 97200250

[51] Int. Cl.⁷ .................................................. G06F 13/38
[52] U.S. Cl. .............................. 710/100; 710/29; 710/60; 710/105; 710/126
[58] Field of Search ................................. 395/285, 309, 395/849, 559, 880; 710/29, 60, 100, 105, 126, 127, 128, 129; 713/600

[56] References Cited

U.S. PATENT DOCUMENTS

| | | | |
|---|---|---|---|
| 4,516,240 | 5/1985 | Kume et al. ............................... | 370/85 |
| 4,635,247 | 1/1987 | Tejima ...................................... | 370/13 |
| 4,689,740 | 8/1987 | Moelands et al. ....................... | 364/200 |
| 4,710,918 | 12/1987 | Miyao ..................................... | 370/85 |
| 5,063,561 | 11/1991 | Kimmo ................................. | 370/85.2 |
| 5,095,425 | 3/1992 | Hesse ..................................... | 395/350 |
| 5,161,151 | 11/1992 | Kimura et al. ........................... | 370/13 |
| 5,559,967 | 9/1996 | Oprescu et al. ........................ | 395/285 |
| 5,629,645 | 5/1997 | Okajima et al. ........................ | 327/399 |

FOREIGN PATENT DOCUMENTS

| | | | |
|---|---|---|---|
| 0051332A1 | 5/1982 | European Pat. Off. .......... | G06F 3/04 |
| 0258873A2 | 3/1988 | European Pat. Off. ........ | G06F 13/42 |

*Primary Examiner*—Xuan M. Thai
*Attorney, Agent, or Firm*—Steven R. Biren

[57] ABSTRACT

A communication bus is split into two sections. When a station connected to one section indicates that it wishes to exchange a message at higher than normal speed via one section, a bridge station isolates the two sections, interrupting transfer of the content part of the message to the other section, and substitutes a dummy content part in the message on the other section.

11 Claims, 5 Drawing Sheets

ELECTRONIC NETWORK ALLOWING MULTI-SPEED COMMUNICATION

BACKGROUND OF THE INVENTION

The invention relates to an electronic apparatus comprising a plurality of stations;

a bus interconnecting the stations for exchange of a message satisfying a signal protocol, the message containing successively time division multiplexed a header signal, a content signal and a signal indicating completion of the message, the bus comprising a first and second section; and a bridge station interconnecting the first and second section.

The invention also relates to a bridge station for use in such an electronic apparatus.

Such an electronic apparatus is known from the commercially available 12C bus system described in the "Data Handbook IC20: 80C51-based 8-bit microcontrollers" issued by Philips Semiconductors in 1994, pages 1141–1159.

The 12C bus uses two signal conductors: a clocksignal conductor (SCL) carrying a clocksignal and a datasignal conductor (SDA) carrying a datasignal. The bus may consist of one section containing a clocksignal conductor and a datasignal conductor, or of several sections, each containing its own clocksignal conductor and datasignal conductor, the sections being interconnected by bridge circuits which pass the clocksignal and the datasignal between the sections. The known bridge stations serve mainly for extending the maximum length of the 12C bus.

Message transfer via the 12C bus requires the stations to participate in various operations according to a signal protocol. When a station wants to initiate a message transfer it has to determine first of all whether the bus is free, which, according to the signal protocol, is the case if no other message transfer has started or if all message transfers that have been started earlier have been terminated by so-called "stop-conditions". These which involve a logic level transition in the datasignai when the clocksignal is at a level that indicates valid data. When the bus is free a station can begin transmitting. In this case all other stations have to monitor the bus for the transmission of so-called "start-conditions" (which also involve a logic level transition in the datasignal when the clocksignal is at a level that indicates valid data) and an address transmitted at a predetermined position after the such a start condition to determine whether they are called upon to participate in message transfer.

This imposes a speed limit on transmission via the 12C bus. If transmission speed were so fast that any one station were too slow to be able to monitor the transmission, errors may ensue because such a station might miss a start or stop condition, or detect a start or stop condition erroneously, leading it to attempt transmission or refrain from transmission erroneously.

Many integrated circuits are available that can function up to a certain speed as stations attached to an 12C bus. In principle it is possible to design additional integrated circuits that can transfer messages at a higher speed than these integrated circuits, but no use can be made of the higher speed of such additional circuits when they are combined with the existing integrated circuits on a conventional 12C bus. This is because errors due to missed or false start and stop conditions may ensue in a slow station during higher speed transfer even if the stations actually participating in transfer of a particular message were capable of transferring that particular message at the higher speed.

OBJECTS AND SUMMARY OF THE INVENTION

It is an object of the invention to increase the speed with which message transfer can occur in a communication bus transfer system according to the preamble without causing errors.

The electronic apparatus according to the invention is characterized in that at least one of the stations is arranged to transmit the content signal at a relatively higher clock speed than the header signal after giving an indication of transmission at such a relatively higher clock speed by means of the header signal, the at least one station and a subset of the stations capable of receiving the message with the content signal at relatively higher speed being connected to the bus via the first section, the bridge station being arranged to pass the header signal between the first and second section, to substitute a substitute signal independent of the content signal for the content signal on the second section of the bus in response to detecting said indication and to resume passing signals between the first and second section in response to the signal indicating completion of the message, the header signal, the substitute signal and the signals passed after the resumption together satisfying the signal protocol at a relatively lower clock speed than the relatively higher clock speed. Such an electronic apparatus may contain both "low-speed" and "high-speed" stations, i.e. stations that are error-prone and error-free respectively at some (higher) speed. All "low-speed" stations receive the clocksignal from the second section of the bus.

Any signals that are relevant for all stations for handling of the signal protocol are passed by the bridge station and reach all stations, but the content signal which involves the higher speed is restricted by the bridge station to the first clock signal conductor. During the time-interval that high speed transmission of the content signal may occur the bridge station presents the low-speed stations with a substitute signal that does not involve high speed transmission, for example by keeping the clocksignal of the second section inactive, to give the appearance of a quiet bus. Thus, the low-speed stations will not be led to commit errors due to high speed message transfer.

The electronic apparatus according to the invention has an embodiment wherein the stations are arranged to use the header for arbitration of bus access rights. For the arbitration process the standard 12C arbitration protocol may be used for example. Thus all stations, both those receiving signals from the first section and those receiving signals from the second section may participate in arbitration to obtain the right to control message transfer via the bus. In case the at least one of the stations signals that it wants to transmit at the higher speed it will be clear after the header whether this station has gained arbitration. After that all other stations, also those connected to the second section of the bus will remain passive and will not take any action during the substitute signal. Thus, a simple overall arbitration protocol spanning both sections of the bus may be used, which at the same time serves to tell the bridge station whether the two sections of the bus should be isolated from one another during transmission of the content signal.

The electronic apparatus according to the invention has a further embodiment wherein the stations are arranged to establish signals on the bus collectively as a wired logic function at least during the header signal, the bridge station passing a wired logic result established in the first section of the bus to the second section of the bus and vice versa during transmission of the header signal and after the resumption, the bridge station generating wired logic drive signals for the second section to drive the substitute signal on the second section. The use of wired logic makes it possible to minimize bus wiring and to eliminate centralized bus control circuits. By use of the bridge station wired logic can be used throughout message transmission on the second section of the bus.

The electronic apparatus according to the invention has a further embodiment wherein the first section comprises at a first and second signal conductor, and the second section comprises a third and fourth signal conductor, the signal protocol requiring that the completion of the message is indicated by a logic transition of a potential of the first and third signal conductors from a first to a second level with the potentials of the second and fourth signal conductors having a specified logic level, the bridge station keeping the third and fourth signal conductor at the first level and the specified logic level respectively during transmission of the content signal on the first section, the bridge station bringing the potential of the third signal conductor from the first level to the second level in response detection of the logic transition of a potential of the first signal conductors from the first to the second level, with the potential of the second signal conductor at the specified logic level. The signal indicating completion of the message is for example a stop-condition such as in the 12C bus, which involves a low to high transition of the datasignal conductor SDA at a time when the clocksignal conductor SCL indicates valid data. According to the invention the signal indicating completion of the message can be passed to the second section merely by passing the logic levels following the signal indicating completion of the message on the first section to the second section. The second section needs to undergo no further transition after the substitute signal and prior to such passing and can therefore very quickly start communicating with the first section.

The electronic apparatus according to the invention has a further embodiment wherein the potential of at least one of the third and fourth signal conductor is established by a wired logic function affectable by a further subset of the stations during transmission of the substitute signal, the bridge station monitoring the potential of at least one of the third and fourth signal conductor, the bridge station resuming the passing of signals between the first and second section in response to detection of a transition in said potential of the at least one of the third and fourth signal conductor. In case of a bus hang-up a station connected to the second section may thus force the bridge station to reopen the connection to the first section. Such a station may do so for example if nothing but the substitute signal is received until the end of a time-out interval. After signal passing is resumed the station may for example force a reset of other stations in the bus communication system.

The electronic apparatus according to the invention has a further embodiment wherein the at least one of the stations comprises a wired logic driving circuit and a push-pull driving circuit for driving the first section of the bus, the at least one of the stations driving the first section by means of the wired logic driving circuit during transmission of the header signal and after transmission of the signal indicating completion of the message, the at least one of the stations driving the first section by means of the push-pull driving circuit during transmission of the content signal. By push-pull operation is meant herein any operation wherein a respective element capable of supplying current is actively switched on to start each of two mutually opposite transitions in the level of the potential. The push-pull drive makes it possible to use a high speed, but it is incompatible with wired logic. The bridge station makes it possible to combine push-pull drive for content signals in the first section with wired logic in the second section.

Push-pull drive is particularly desirable for the clocksignal because this signal usually has a higher frequency than the datasignal (in particular in the 12C bus). Thus multiple clock sources may be used, with push-pull drive for the clock signal during most of the message i.e. during the content signal.

The electronic apparatus according to the invention has a further embodiment wherein the at least one of the stations is capable of transmitting at least two types of header signal indicating transmission with and without the relatively higher clock speed respectively, the bridge station continuing to pass signals between the first and second section in response to the type of header signal indicating transmission without the relatively higher clock speed. Thus the at least one of the stations may select whether the bridge station remains open, for example for communication with a station connected to the second section of the bus, or whether the bridge station isolates the two sections of the bus for high speed transfer of the content signal The electronic apparatus according to the invention has a further embodiment wherein the at least one of the stations is arranged to transmit an address signal following the header signal and preceding the content signal at the relatively high clock speed, each particular one of the station of the subset responding selectively to the message, depending on whether the address signal matches an own address of the particular one of the stations. Thus only the header, which indicates the high speed and may also serve for the purpose of arbitration, needs to be transmitted at low speed. Addressing, i.e. selecting one of several stations connected to the first section may also be done at high speed.

The electronic apparatus according to the invention has a further embodiment wherein the at least one of the stations is arranged to transmit a further address signal following the content signal and preceding a further content signal preceding the signal indication completion of the message, the further address signal and the further content signal being transmitted at the relatively high clock speed, each particular one of the station of the subset responding selectively to the further content signal, depending on whether the further address signal matches an own address of the particular one of the stations, the bridge station maintaining the substitute signal on the second section during transmission of the further address signal and the further content signal. Thus several different stations can be addressed at high speed while the second section is kept isolated. This can be done for example using repeated start conditions supplied to the first section according to the 12C protocol followed by the corresponding addresses.

Most of these advantageous features are made possible by the bridge station. The invention makes it possible to connect slow stations to the second sections to use those features, even though these slow stations may be conventional 12C stations whose connection to the bus is entirely optional.

BRIEF DESCRIPTION OF THE DRAWINGS

These and other advantageous aspects of the invention will be described further using figures in which.

DETAILED DESCRIPTION OF THE PREFERRED EMBODIMENTS

Figure 1:
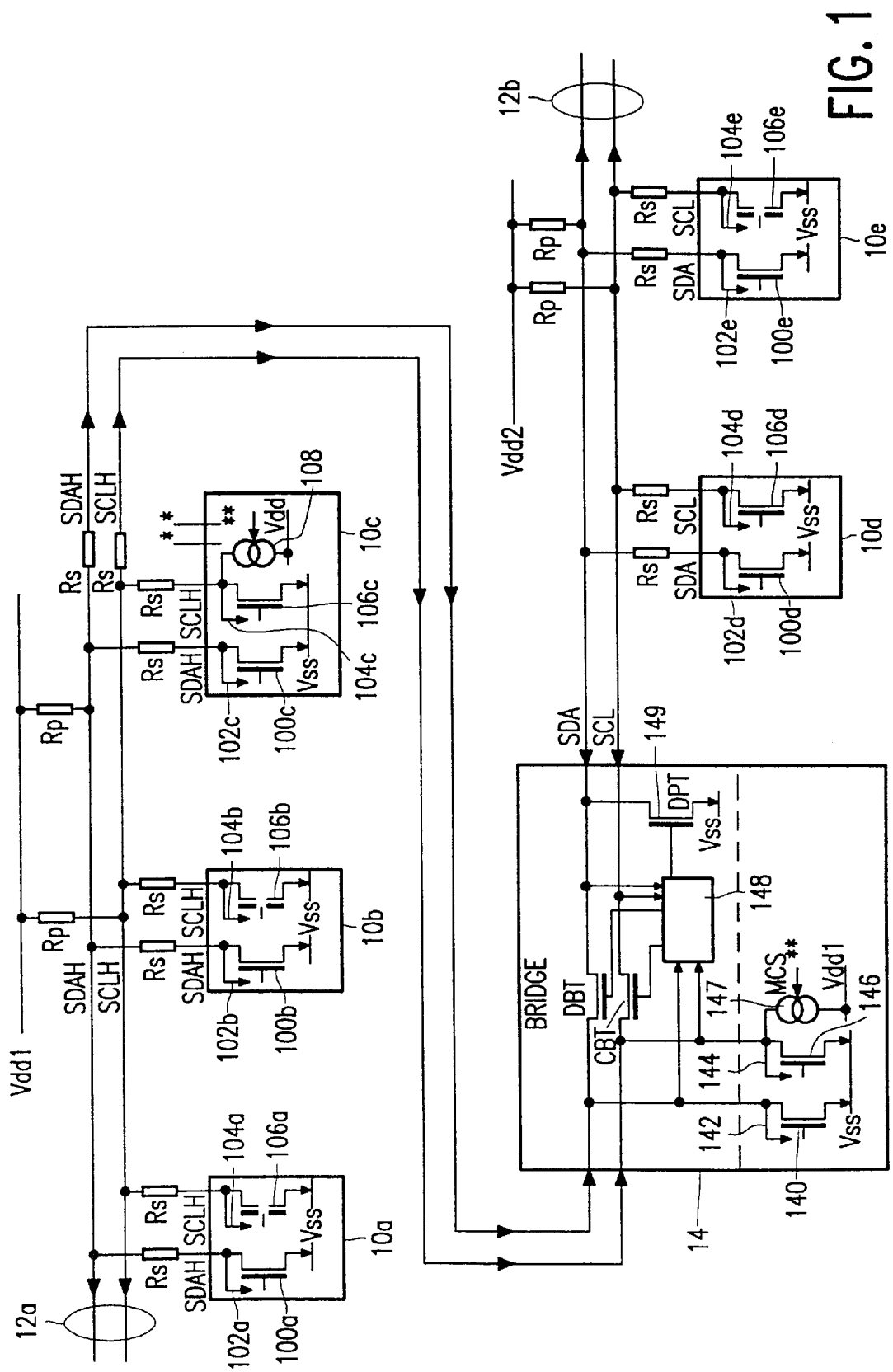
FIG. 1 shows an apparatus according to the invention

FIG. 1 shows an apparatus according to the invention with a communication bus 12a,b containing a first and second section 12a, 12b. The apparatus contains a number of stations 10a–e connected to the communication bus 12a,b and a bridge station 14 connecting the two sections 12a,b of the communication bus. Each section of the bus 12a,b contains a clocksignal conductor SCL, SCLH and a datasignal conductor SDA, SDAH. The stations 10a–e are connected to the conductors 12a,b via resistors Rs, which serve for suppressing interfering pulses and ringing due to excessively fast signal edges.

The stations 10a–e are divided into a first and second subset 10a–c, 10d–e, corresponding to the first and second section 12a,b of the bus respectively. Each station 10a–e belonging to a subset 10a–c, 10d–e has connections to the clocksignal conductor SCL, SCLH and the datasignal conductor SDA, SDAH of the section 12a,b corresponding to that subset 10a–c, 10d–e.

In each station 10a–e the connection to the datasignal conductor SDA, SDAH has a coupling 102a–e to an input filter (not shown). In each station the connection to the datasignal conductor SDA, SDAH is coupled to a first powersupply connection Vss via the channel of a transistor 100a–e. The datasignal conductors SDA, SDAH of each section 12a,b are connected to a respective second power supply connection Vdd1, Vdd2, a resistor Rp.

In each station 10a–e the connection to the clocksignal conductor SCL, SCLH has a coupling 104a–e to a further input filter (not shown). In some of the stations 10c,d the connection to the clocksignal conductor SCL, SCLH is coupled to the first powersupply connection Vss via the channel of a transistor 106c,d. Such a transistor 106a,b,e is optional in the other stations 100a,b,e. The clocksignal conductors SCL, SCLH of each section 12a,b are also connected to the respective second power supply connections Vdd1, Vdd2, via a resistor Rp.

At least one of the stations 10c connected to the first section 12a contains a switchable current source 108 coupled between the clocksignal conductor SCLH of the first section 12a and the second powersupply connection Vdd1. As a switchable current source a MOS transistor (not shown) may for example be used, with its drain connected to the clocksignal conductor SCLH. Preferably this MOS transistor is made so small that no damage to the apparatus may ensue if due to an error the current source 108 supplies current at the same time as a transistor 106a–e conducts.

The bridge station 14 contains a first transistor DBT whose channel connects the datasignal conductors SDA, SDAH of the two sections 12a,b of the bus. The bridge station 14 contains a second transistor CBT whose channel connects the clocksignal conductors SCL, SCLH of the two sections 12a,b of the bus. The bridge station 14 contains a third transistor DPT 149 whose channel connects the datasignal conductor SDA of the second section 12b of the bus 12a,b to the first power supply connection Vss. The bridge station 14 contains a control circuit 148 which receives input signals from the datasignal conductors SDA, SDAH and the clocksignal conductors SCL, SCLH of both sections 12a,b of the bus. The control circuit 148 has outputs coupled to the control electrodes of the first, second and third transistors DBT, CBT, 149 respectively.

Furthermore, like the first subset of the stations 10a–c, the bridge station 14 contains a coupling 142 from the datasignal conductor SDAH and the clocksignal conductor SCLH of the first section 12a to an input filter (not shown) and a further input filter (not shown) respectively. The bridge station 14 also contains transistors 140, 146 whose channels couple the datasignal conductor SDAH and the clocksignal conductor SCLH of the first section 12a to the first power-supply connection Vss. The bridge station 14 furthermore contains a switchable current source 147 coupled between the clocksignal conductor SCLH of the first section 12a and the second powersupply connection Vdd1.

In operation the apparatus can function in a first and second mode. In the first mode, the apparatus functions entirely according to the conventional 12C protocol. In the first mode the control circuit 148 in the bridge station 14 drives the control electrodes of the first and second transistor CBT and DBT to the potential level of the lowest of the two second supply voltages Vdd1, Vdd2, so that these first and second transistors CBT, DBT will pass signals from the first section 12a of the bus to the second section 12b and vice versa. When the potential of a conductor SCL, SCLH, SDA, SDAH in one section 12a, 12b is pulled to the first power supply potential, the potential of the corresponding conductor SCL, SCLH, SDA, SDAH on the other section 12a,b will also be pulled low. Otherwise, the potential of the conductors will be pulled up to the potential of the relevant second power supply connection Vdd1, Vdd2 via the resistors Rp. In principle, the bridge station 14 leaves the transistors 140, 146, 149 connecting the bus to the first power supply connection Vss and the switchable current source 147 unconductive in the first mode (unless the bridge station participates in the 12C protocol as a normal station).

The second supply potential Vdd1, Vdd2 are for example 3.3V and 5V above the first supply connection Vss. Other second power supply potentials Vdd1, Vdd2 may also be used. This allows the sections of the bus 12a,b to operate with different power supplies. Thus, the first and second transistor CBT and DBT serve the dual purpose of providing a voltage level shift between the two sections of the bus 12a,b, allowing the use of subsets of stations 10a–e that operate with different supply voltages, and of isolating the two sections when high speed message transfer takes place in the first section. Preferably, the second supply potential Vdd1 of the first section 12a (which is capable of high speed message transfer) is lower than that of the second section 12b. Amongst other reasons, this will counteract the effect of increased power consumption due to the higher frequency. However, the potentials Vdd1, Vdd2 may also be taken equal to each other. In this case the first and second transistor CBT and DBT function only as switches connecting or disconnecting the two sections 12a,b of the bus.

In the first mode the stations 10a–e may communicate with each other using the 12C protocol. This protocol is described in the "Data Handbook 1C20: 80C51-based 8-bit microcontrollers" issued by Philips Semiconductors in 1994, pages 1141–1159. Briefly, the protocol starts from a quiet state of the bus, in which all conductors SDA, SDAH, SCL, SCLH are at the potential of the relevant second power supply Vdd1, Vdd2. A station (e.g. 10c) which wants to start communication generates a start condition by pulling the potential of the datasignal conductors SDA, SDAH to the first power supply potential Vss (by making the channel of transistor 100c conductive). The potential of the clocksignal conductor SCL, SCLH is left at the second power supply potential level Vdd1, Vdd2 (by leaving the channel of transistor 106c unconductive). This combination of signals on the conductors SDA, SDAH, SCL, SCLH is called a start condition. Subsequently, the station 10c attempts to generate a series of clocksignal pulses and datasignal levels, by either making the transistors 100c, 106c connecting the bus to the first power supply Vss conductive or unconductive. Data is validated by allowing the clocksignal conductors SCL, SCLH to be pulled toward the second power supply potential Vdd1, Vdd2. Other stations 10a–e can delay clockpulses by keeping the clocksignal conductor pulled toward the first power supply potential Vss (using the transistors 106a–c connecting the clock signal conductors SCL, SCLH to the first power supply connection Vss). This allows the other stations 10a–e to take as much time as needed for handling the data.

The station 10c wanting to start communication (called the "master station") supplies a header as data to the bus 12a,b, followed by an address of a "slave" station 10a–e with which it wishes to communicate, and a bit (read/write bit) of data indicating whether the master station or the slave station is to write data to the bus. Each station 10a–e receives the datasignal and clocksignal from the bus 12a,b via its input filters (not shown) which remove noise, like spikes. Each station 10a–e determines if the received signals contain its address and whether read or write is needed and starts participating in communication accordingly.

Subsequently either the master station 10c or the slave station 10ab,de supplies data to the bus 12a,b. After this exchange of data the master station 10c may issue a renewed start condition followed by another address of a slave station 10ab,de with a read/write bit to exchange data with another slave station 10ab,de. Finally, the master station generates a so-called "stop-condition" by allowing the potential of the datasignal conductors SDA, SDAH to be pulled from the first power supply potential Vss to the second power supply potential Vdd1, Vdd2 at a time when the potential of the clock signal conductors SCL, SCLH is left at the second power supply potential level Vdd1, Vdd2.

In the 12C protocol data is transferred in units of 8 successive bits. Each unit is followed by an acknowledge bit in which a station 10a–e receiving the data may acknowledge reception by pulling the potential of the datasignal conductor SDA, SDAH towards the first power supply potential and then allowing the potential of the clock signal conductors SCL, SCLH to be pulled toward the second power supply potential Vdd1, Vdd2. In case the receiving station 100a–e has missed the unit, or was unable to handle it, the receiving station allows the potential of the datasignal conductors SDA, SDAH to be kept pulled toward the second power supply Vdd1, Vdd2 during the clocksignal pulse for the acknowledge bit. In response, the station 100a–e transmitting the unit will, for example retry transmission or break-off transmission.

More than one station 10a–e may attempt to become master station by generating a start condition and subsequent data. If such a station 10a–e notes that the bus 12a,b is busy (start condition has been transmitted and following stop condition has not yet been transmitted) it will wait until the bus 12a,b is quiet. This leaves the possibility that two stations 10a–e generate a start condition at substantially the same time. To solve this problem the stations 10a–e monitor the potential of the datasignal conductor SDA, SDAH. If this potential is pulled towards the first power supply potential Vss during any clock pulse (except acknowledge) at a time when the station 10a–e had left its transistor 106a–e unconductive in order to allow the potential of the datasignal conductor to be pulled towards the second power supply potential Vdd1, Vdd2, the station 10a–e concludes that another station 10a–e also attempts to become master station and ceases transmission until after the next stop condition (unless of course if it is addressed). This process is called arbitration, and a station 10a–e ceasing transmission is said to have lost arbitration.

In the second mode of operation ("the high speed mode") use is made of the switchable current sources 108, 147 to actively increase the speed with which the potential of the clock signal conductor SCLH of the first section 12a is pulled towards the second power supply connection Vdd1. This forms a push-pull stage in which both for generating rising edges in the clocksignal and for generating falling edges a device like a transistor is actively switched on, only to be switched off again before the following opposite edge. This is in contrast to the wired logic drive in the first mode, in which only one edge of the clock signal is generated actively, the other edge being caused by charging through the resistor Rp if no other station drives the clocksignals conductor SCL.

In the first mode, the frequency of the clocksignal is typically below 400 kbit/sec and in the second mode, the frequency of the clocksignal may rise to 3.4 Mbit/sec, i.e. well above 400 kbit/sec and usually above 1 Mbit/sec. It is an object of the invention to make this second mode of operation possible in an apparatus which also contains stations 10a–e which have been designed without attention to this mode (e.g. containing input filters (not shown) that filter out such high frequencies). Other objects of the invention and to combine this second mode with the arbitration and acknowledge process of the 12C protocol.

Figure 2:
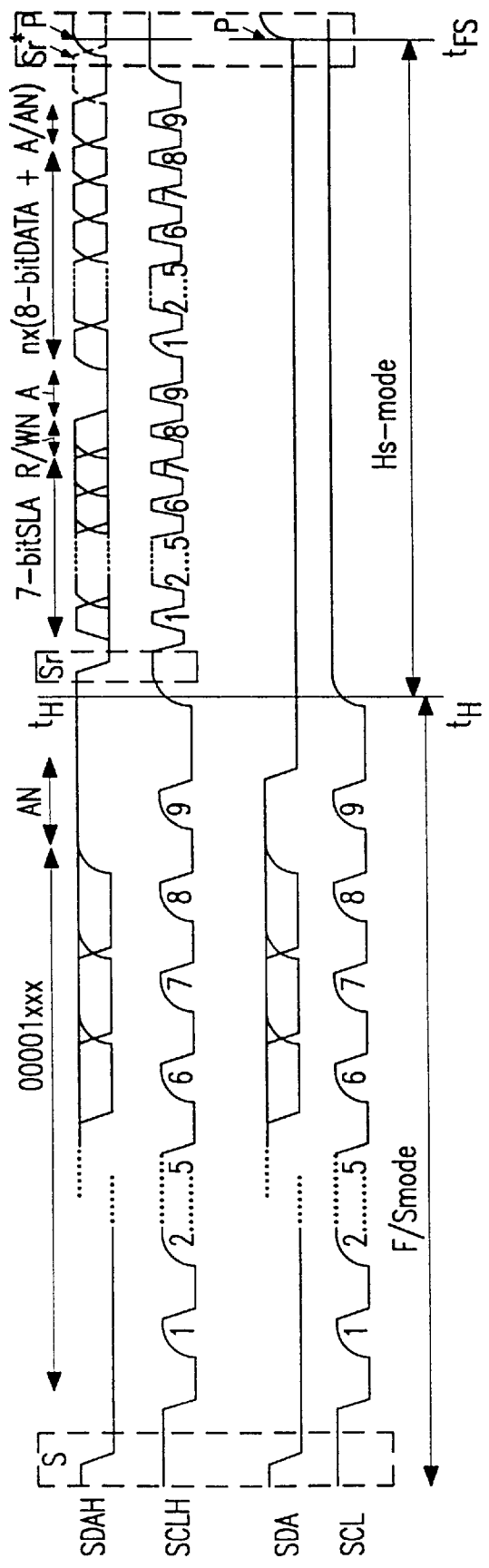
FIG. 2 shows a signal diagram of message transfer

FIG. 2 shows a signal diagram of message transfer using the second, high speed mode. Until a time tH message transfer starts in the first mode (conventional 12C) with a start condition S followed by header bits 1–9 using the conductors SDA, SDAH, SCL, SCLH of both sections of the bus 12a,b. Arbitration takes place during transmission of the header in the first mode, which thus serves as an arbitration mode. The arbitration is used to ensure that a station 10a–e wishing to exchange information in high speed mode can be sure that it has either lost arbitration or that all other stations 10a–e have detected that they have lost arbitration. This is achieved by assigning a unique header to each station in the apparatus that can transmit in high speed mode (i.e. the unique header is different for each such station). These unique headers have a "lower" value than any header used for conventional 12C message transfer (lower in the sense that a station 10a–e putting a header used for conventional 12C message transfer on the bus 12a,b will always lose arbitration against a station 10a–e putting its unique header on the bus 12a,b).

The unique headers are for example in the range 00001xxx (in order of transmission, 0 indicating that the datasignal conductors SDA, SDAH are pulled toward the first power supply potential Vss by the transistor 100a–e connecting the datasignal conductor SDA, SDAH to the first power supply connection, 1 indicating keeping that transistor 100a–e unconductive, "x" indicating a state of that transistor 100a–e specific to the unique code of a particular station). Normal 12C headers have at least one "1" bit in the first four bits. This selection of unique headers allows an additional range of headers 00000xxx, whose use by a station 10a–e allows guaranteed arbitration victory over the unique headers for special purposes such as a so-called general signal known from 12C.

A station 10a–e has the option to use either a conventional 12C header, if it does not want to communicate in high speed mode, for example because it is known that the communication partner is not capable of working in that high speed mode, or its unique header if it wants to use the high speed mode. Transmission of the header in the first mode (conventional 12C) allows all stations to participate in arbitration. The header is optionally followed by an acknowledge bit, which should not be acknowledged.

If the station e.g. 10c wishing to communicate in the second high speed mode becomes master station by winning arbitration it switches to the high speed mode at a time tH. After that time tH the master station enters into a data transfer mode. In this mode the master station 10c transmits a renewed start condition Sr followed by an address of a slave station (bits 1–7) and a read/write bit (8). The address may be extended as defined for the 12C bus. This is followed by an acknowledge bit and a number of data units, each with its own acknowledge bit. In the second, high speed or data transfer mode the master station normally generates the rising edges of the clocksignal by making the transistor 100c connecting the clocksignal conductor SCLH to the first power supply connection Vss unconductive, and activating the switchable current source 108 to supply current to the clocksignal conductor SCLH. This is indicated in FIG. 2 by using straight rising edges, instead of exponentially sloping rising edges which are shown in case the switchable current source is not activated and the rising edges are caused by the resistor Rs.

Optionally, the master station 10c leaves the switchable current source 108 inactive at the rising edge of the clocksignal on the clocksignal conductor SCLH for each first bit of a data unit. In this case, the potential of the clocksignal conductor SCLH is left to rise due to charging via the resistor Rs connected to the second power supply connection Vdd1. This allows a slave station 10a-b participating in communication with the master station 10c to delay the rising edge of the clocksignal by keeping its transistor 106a–b connecting the clocksignal conductor SCLH to the first power supply connection Vss conductive. The master station resumes generation of the clocksignal pulses only after the potential of the clocksignal conductor SCLH has risen. Thus a slave station 10a–b may delay transmission of the next data unit until it is ready to handle that data unit.

After completing exchange of data with one slave station 10a–b, the master station 10c may generate a renewed start condition Sr* (indicated by a dashed line), followed by the address of a new slave station and a new read/write bit for a further exchange of data. This may be repeated any number of times. Instead of the renewed start condition Sr* the master station may generate a stop condition P indicating completion of message transfer and readiness for renewed arbitration. This ends the second, high speed mode and a return to the first conventional 12C mode at a time tFS.

The bridge station 14 isolates the second section of the bus 12b from the first section 12a during the second, high speed mode. For this purpose the control circuit 148 monitors transmission on the bus 12a,b.

Figure 3:
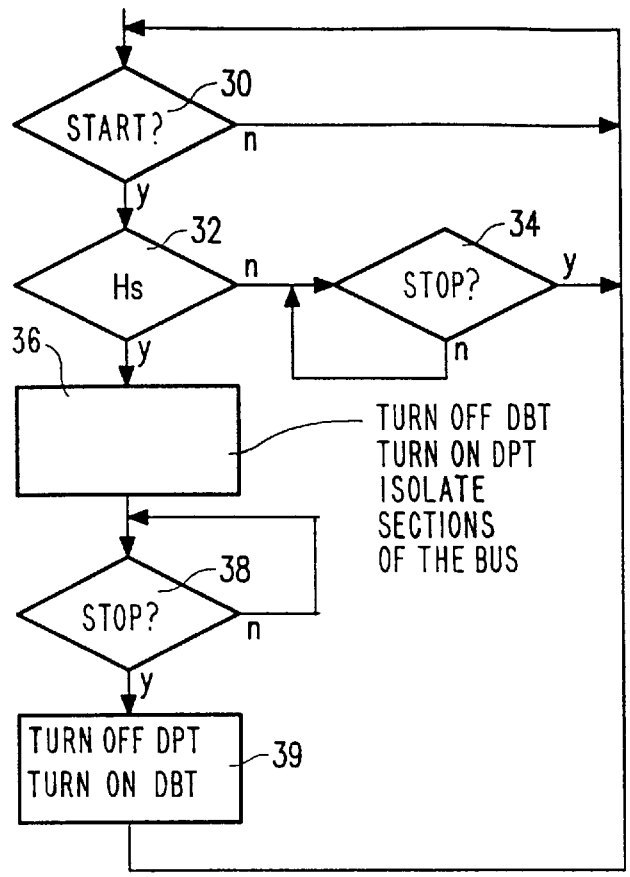
FIG. 3 shows a flow chart of operation of a control circuit

FIG. 3 shows a flow chart of operation of the control circuit 148. Initially, the control circuit 148 supplies the lowest of the two second supply potentials Vdd1, Vdd2 to the control electrodes of the first and second transistor CBT, DBT so as to allow these transistors CBT, DBT to pass datasignals and clocksignal from one section of the bus 12a,b to the other and vice versa. The control circuit 148 supplies the third transistor DPT with the first supply potential Vss, to keep it unconductive. In this state, the control circuit 148 monitors the bus for a start condition. This is represented by step 30 of the flow chart. This continues until the control circuit 148 detects a start condition. The control circuit 148 then executes a second step, in which it determines from the header of the message following the start condition whether transmission in the second, high speed mode will take place. This is done by determining whether the header matches any one of the unique headers assigned to stations 10a–c capable of transmitting in high speed mode. Preferably these unique headers form an uninterrupted range. In this case the control circuit 148 does not need to store each individual unique header.

If the header does not match any of the unique headers no transmission in the high speed mode will take place, and the control circuit will execute a third step 34 in which the control circuit monitors the bus for a stop condition. Upon this stop condition the control circuit returns to the first step.

If the header does match any of the unique headers transmission in the high speed mode will take place, and the control circuit will execute a fourth step 36. In this step the control circuit 148 brings the potential of the control electrode of the first transistor DBT which connects the datasignal conductors SDA, SDAH of the two sections to the first power supply level Vss, so as to make the first transistor DBT unconductive. The control circuit 148 supplies one of the second power supply potentials to the third transistor DPT, so as to make the third transistor DPT conductive, connecting the datasignal conductor SDA of the second section 12b to the first power supply potential. Then the control circuit 148 waits until the potential of the clocksignal conductors SCL, SCLH rises prior to the renewed start condition Sr after the header and the optional acknowledge bit (at which time it is certain that all stations have accepted the arbitration result) and thereupon the control circuit 148 supplies the first power supply potential Vss to the control electrode of the second transistor CBT which is connected between the clocksignal conductors SCL, SCLH of the two sections 12a,b of the bus. This isolates the clocksignal conductors SCL, SCLH of the two sections 12a,b of the bus.

Next, the control circuit 148 executes a fifth step 38 of the flow chart in which the control circuit 148 monitors the first section of the bus for a stop condition. In response to that stop condition, the control circuit 148 executes a sixth step 39, making the third transistor DPT unconductive. This causes the potential of the datasignal conductor SDA of the second section of the bus to rise, creating a stop condition also on the second section of the bus. The control circuit 148 then makes the first transistor DBT conductive by supplying the lowest of the two second supply potentials Vdd1, Vdd2 to its control electrode. The control electrode of the second transistor CBT is also supplied with the lowest of the two second power supply potentials Vdd1, Vdd2. After the sixth step 39 the control circuit 148 returns to the first step 30 of the flowchart.

In this way, the signals on the second section of the bus 12b simulate the state of an 12C bus after arbitration, but without any data, followed by a stop condition when message transmission on the first section of the bus 12a is completed. Thus the stations 10d–e receiving the datasignal and clocksignal from the second section of the bus 12b are not exposed to the high frequency signals from the first section 12a, but to a quiet but busy bus which does not allow these stations 10d,e to attempt to start a new message until the message on the first section of the bus is completed.

In principle, the bridge station 14 could also supply signals to the second section of the bus 12b to exchange its own data via that second section 12b during the time that the message is exchanged over the first section of the bus 12a; the bridge station might even allow arbitration to take place on the second section during that time. But in that case, the bridge station 14 must ensure that both sections individually return to a state following or immediately preceding a stop condition before reestablishing contact between the sections 12a,b.

Optionally, the control circuit 148 may also monitor the second section of the bus 12b. This is advantageous for making it possible to break hang-ups in which the message on the first section of the bus is never completed or the connection between the busses is not reestablished due to an error. A station 10d–e connected to the second section of the bus 12b may perform a watchdog function to detect such a hang-up: if a stop condition is not detected within a predetermined watchdog time-interval after a start condition, a station connected to the second section of the bus 12b may generate a break-up signal, by pulling down the potential of the clocksignal conductor SCL of the second section of the bus 12b a number of times (once or more). The control circuit 148 optionally detects the resulting dip or dips in the potential of the clocksignal conductor SCL of the second section of the bus 12b and in response returns to the initial state (step 30) in which the control circuit 148 supplies the lowest of the two second supply potentials Vdd1, Vdd2 to the control electrodes of the first and second transistor CBT, DBT so as to allow these transistors CBT, DBT to pass datasignals and clocksignals from one section of the bus 12a,b to the other and vice versa. In response to detection of the dip or dips the control circuit 148 also supplies the third transistor DPT with the first supply potential Vss, to keep it unconductive. This allows stations 10d–e to force signals (e.g. a stop condition) on both sections of the bus 12a,b in order to reset any station that is involved in the hang-up.

In FIG. 1 the bridge station has been provided also with a normal interface to the first section of the bus 12a, like any another station e.g. 10c. This allows the bridge station 14 to function also as a normal station 10a–c. Each of the stations 10a–e may be included in a separate IC package. In this case the function of bridge station and normal station may be combined in a single IC package, which needs four pins (SDA, SDAH, SCL, SCLH) for connection to the bus 12a,b. The use of these pins may be made programmable, so that upon suitable programming the pins SDA, SCL used for connection to the second section 12b can also be used for other purposes if the IC package is not used as a bridge station. This is the case for one of the stations 10c in which two pins marked by a * are used for these other purposes (if any), but could also serve for as bus connections SDA, SDAH.

Of course when only stations capable of handling the second, high speed mode are present in the apparatus, no bridge function is necessary at all and the second section of the bus 12b may be omitted; in this case the connections for the second section 12b of the bus may be used for other purposes as well.

As shown in FIG. 1, no switchable current source is used for the datasignal conductor SDAH of the first section 12a, but instead a pull-up resistor Rp is used to pull-up the potential of this conductor. This can be combined with a fast clocksignal generated with a switchable current source 108, because the datasignal needs to have only half the frequency of the clocksignal. Of course for higher speed a switchable current source may be used for the datasignal as well, just as for the clocksignal. However, this requires more accurate timing to avoid drive conflicts.

Figure 4:
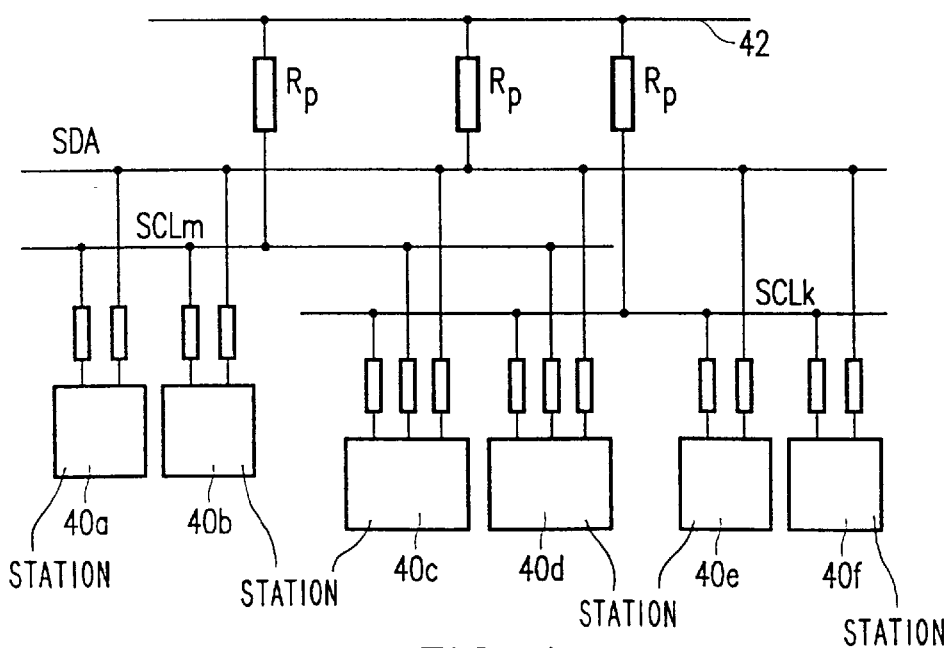
FIG. 4 shows an apparatus according to an alternative embodiment of the invention

FIG. 4 shows an apparatus according to an alternative embodiment of the invention. This apparatus contains a number of stations 40a–f. The stations 40a–f are connected via a communication bus which contains two sections containing respective clock signal conductors SCLm and SCLk. A datasignal conductor SDA is shared by the sections. Furthermore, the apparatus contains a supply conductor 42 for a supply voltage Vdd. The supply conductor 42 is coupled to the datasignal conductor SDA and the two clock signal conductors SCLk, SCLm each via a respective resistor Rp. Two of the stations 40a,b are shown to be connected to the datasignal conductor SDA and one of the clock signal conductors SCLm. Two other stations 40e,f are shown to be connected to the datasignal conductor SDA and the other one of the clock signal conductors SCLk. The remaining stations 40c,d are shown to be connected to the datasignal conductor and both the clock signal conductors SCLm and SCLk. By way of example, the apparatus may contain a printed circuit board, on which the datasignal conductor SDA and the two clock signal conductors SCLm, SCLk are realized as conductor tracks, the stations 40a–f each corresponding to an individual integrated circuit mounted on the printed circuit board and electrically connected to the datasignal conductor SDA and one or more of the clock signal conductors SCLm, SCLk.

In operation, information is transferred between the stations via the bus SDA, SCLk, SCLm. The information transfer is performed according to an extension of the I2C bus specification described in the Philips Databook IC12a for a bus consisting of datasignal conductor SDA and one clock signal conductor SCL. During information transfer, a bit of information is put on the datasignal conductor SDA, and its validity is signalled by making the potential of a relevant clock signal conductor SCLk, SCLm high. In preparation of a next bit of information, the potential of the clock signal conductor SCLk, SCLm is made low again. Subsequently the process repeats itself with the next bit. Information transfer may be performed with a slow speed (for example with a clock frequency of 100 k to 400 k clock pulses per second), in which case the clock signal is provided at least via the first clock signal conductor SCLk. Information may also be provided at a high speed (for example 4M clock pulses per second) in which case the clock signal is provided via the second clock signal conductor SCLm but not via the first clock signal conductor SCLm. Stations 40c,d which cannot operate at the high clock speed are thus not exposed to a high speed clock signal.

At the end of the message the master station (e.g. 40c,d) that has control of the bus signals termination of the message using at least the first clock signal conductor SCLk (and the second clock signal conductor SCLm in case not all of the stations are connected to the first clock signal conductor SCLk). Thus all stations, i.e. also stations 40e,f which cannot operate at the high clock speed, can detect the end of the message even when the information content of that message itself is transmitted using a high clock speed.

Figure 5:
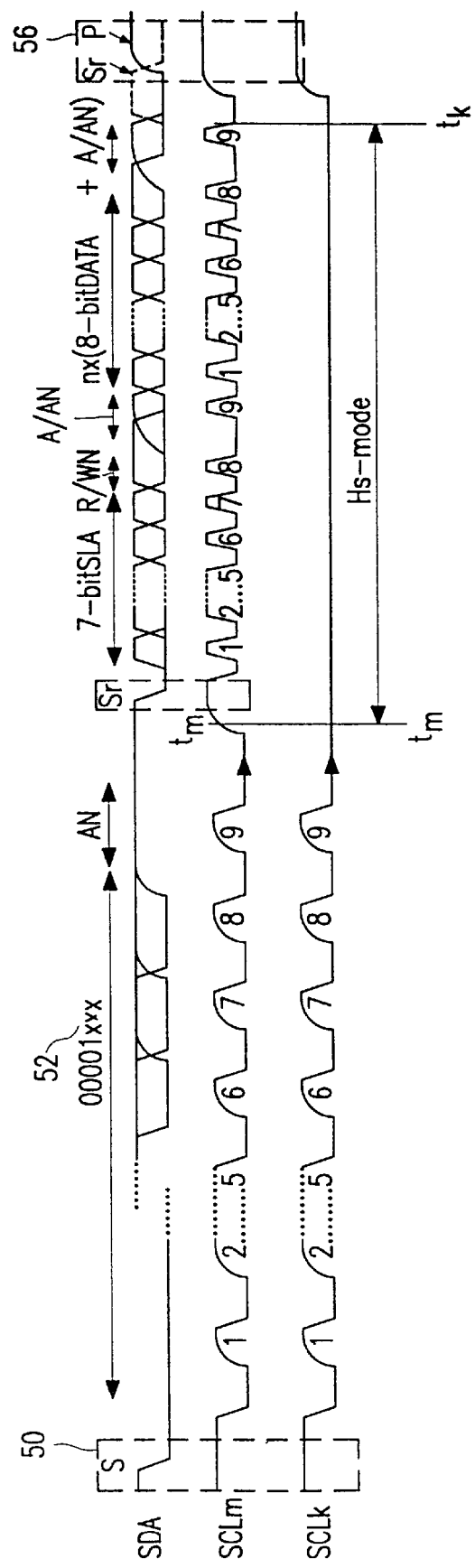
FIG. 5 shows a signal of an embodiment of message transfer

FIG. 5 shows a timing diagram of an embodiment of message exchange via the bus SDA, SCLm, SCLk. Message exchange starts with a time interval in which a start signal 50 of the message transmitted, and if necessary signals 52 for arbitration between potentially different master stations.

The start signal 50 is intended for all stations 40a–f and is therefore transmitted at least using the first clock signal conductor SCLk and in case some stations 40e,f are connected only to the second clock signal conductor SCLm also via that clock signal conductor SCLm.

As start signal a so-called "start condition" 50 is used, which is a level transition of the potential of the datasignal conductor SDA caused by a master station (e.g. 40c,d) while the potentials of the two clock signal conductors SCLm, SCLk are both high, that is, at the level which ordinarily signals that the datasignal conductor SDA carries valid data high (or at least when the potentials of the first clock signal conductors SCLk is high in case that clock signal conductor is connected to all stations 40a–f). The master station (e.g. 40c,d) which starts the message causes the level transition by providing a low impedance path between a low potential power supply terminal and the clock signal conductors SCLm, SCLk.

The start condition is the beginning of an arbitration process. The start condition is detected by the other stations. As a result of detection any other master stations (e.g. 40c–d) that have not sent a start condition will refrain from starting messages until a stop condition (to be described later) is detected. The master station that transmits a start condition cannot be sure that it is the only master station (e.g. 40c,d) requesting control of the bus, because it is impossible to detect whether another master station (e.g. 40c, d) has transmitted a start condition more or less simultaneously.

The arbitration process is continued by transmission of a code 52 comprising eight data bits, transmitted by any master station 40c,d requesting control of the bus. For this purpose, eight clock pulses are generated on both clock signal conductors (or at least on the first clock signal conductors SCLk is high in case that clock signal conductor is connected to all stations 40a–f). To generate these clockpulses the stations use the wired logic operation of the bus: the station do not use active pull-up, This allows any station to delay the clockpulses in order to have enough time to handle the data.

Each master station (e.g. 40c,d) which has transmitted a start condition and still participates in arbitration pulls down the clock signal conductors SCLk, SCLm so as to generate the clock pulses. Each such master (e.g. 40c,d) puts the bits of its code sequentially on the datasignal conductor SDA by selecting to provide either a low or high impedance path between the datasignal conductor SDA, according to its code, during the time intervals that the clock signal conductors are pulled low. Any master station that does not provide a low impedance path and yet detects that the datasignal conductor SDA is pulled low concludes that it has lost arbitration and ceases to transmit clock pulses and data until it detects a stop condition.

At least one master station (e.g. 40c,d) is capable of transferring information at high clock speed (e.g. 4 Mbit per second). The codes of the master stations (e.g. 40c,d) are chosen so that the own codes of that master station or those master stations are unique so that any such master can be sure that it has won arbitration if it has not ceased transmitting its code as data after the eighth bit.

A master station (e.g. 40c,d) capable of transferring information at high clock speed can switch to high clock speed if it has won arbitration and if it wants to transfer information to a slave station (40a–f) which is also capable of transferring information at high clock speed. In this case, the master station (e.g. 40c,d) switches to a high speed mode at a time tm. In the high speed mode the master station (e.g. 40c,d) transmits clock pulses at high speed via the second clock signal conductor SCLm, but not via the first clock signal conductor SCLk. In the high speed mode the master station (e.g. 40c,d) keeps the potential of the first clock signal conductor SCLk at low level, i.e. at the level indicating that no valid data is present on the datasignal conductor SDA.

In the embodiment of FIG. 5, transmission in the high speed mode begins with a renewed start condition, implemented as a level transition of the potential of the data signal conductor SDA when the potential of the second clock signal conductor SCLm is high. The renewed start condition is followed by transmission of a slave address of a slave station (e.g. 40a,b) generated by the master station by producing clock pulses on the second clock signal conductor SCLm, and supplying successive bits of the slave address during the high level of successive clock pulses. The slave stations (e.g. 40a,b) capable of transferring information at high speed monitor the transmitted address and a slave which detects its own address starts participating in information transfer. Transfer may be from the master station (e.g. 40e,f) to the slave station (e.g. 40e,f) or vice versa, as defined in the 12C specification, except that only the second clock signal conductor SCLm is used, which can be driven in push-pull.

When the master station (e.g. 40c,d) is finished it switches from the high speed mode (at time tk) and signals the end of the message by means of a stop condition 56. The stop condition 56 involves a level transition on the datasignal conductor SDA when the potential of both clock signal conductors SCLm, SCLk is high, i.e. at the level ordinarily indicating valid data (in case all stations 40a–f are connected to the first clock signal conductor SCLk a high level on that clock signal conductor suffices). The level transition on the datasignal conductor during the stop condition is opposite to that during the start condition 50.

All stations 40a–f detect the stop condition 56. Thereafter master stations 40a–f are free to attempt to gain control of the bus again, and slave stations 40a–f monitor the bus for new messages to detect whether they are addressed to be involved in information transfer.

When a master station 40a–f has gained control of the bus, it may also choose to transfer information at low clock speed (e.g. less than 1 Mhz, for example 100 to 400 kbit per second), for example because the slave station involved in information transfer is only capable of transferring information at low speed and not at high speed (e.g. more than 1 MHz, for example 4Mbit per second), or because the master itself is only capable of low speed. In that case the master station 40a–f uses the first clock signal conductor SCLk to pass clock pulses that define the slave address and any information to be transferred, basically as specified for 12C.

Between the initial start condition 50 and the stop condition 56 the master station 40a–f that has gained control of the bus may generate any number of additional start conditions followed by transmission of a slave station address and information transfer, without having to participate anew in arbitration for control of the bus. Depending on whether the information transfer following an additional start condition is to be at low speed or at high speed, the potential of the first clock signal conductor SCLk or of the second clock signal conductor SCLm is kept high level during an additional start condition. Thus any combination of high speed and low speed transfers may be used in one message.

Stations 40a–f monitoring only one clock signal conductor SCLk or SCLm will not recognize addressing and information transfer involving the clock signal conductor SCLk or SCLm that they do not monitor. Such stations keep waiting for a relevant address, or information until they receive a stop condition 56.

When more than two different clock speeds are to be used, with stations that are capable of transferring information only at the slowest speed, or only at the slowest and the middle speed, or at more speeds, one may in principle use a correspondingly greater number of clock signal conductors, each for a particular speed, the initial start condition, any arbitration and the stop condition involving only the slowest speed.

It will be noted from FIG. 4 that master stations (e.g. 40c,d) that are capable of higher speed information transfer have connections to all of the clock signal conductors, in order to be able to signal start of message to all stations 40a–f, to arbitrate and to be able to transfer information with all other stations 40a–f. Stations 40c,d capable only of slow speed information transfer are connected only to the first clock signal conductor SCLk. These stations may include master stations, which are then only able to transfer information at low speed. Slave stations 40a,b that are capable of high speed information transfer, that do not need to contend for control of the bus, and that need to communicate only with master stations capable of high speed information transfer need to be connected to the second clock signal conductor SCLm only.

Figure 6:
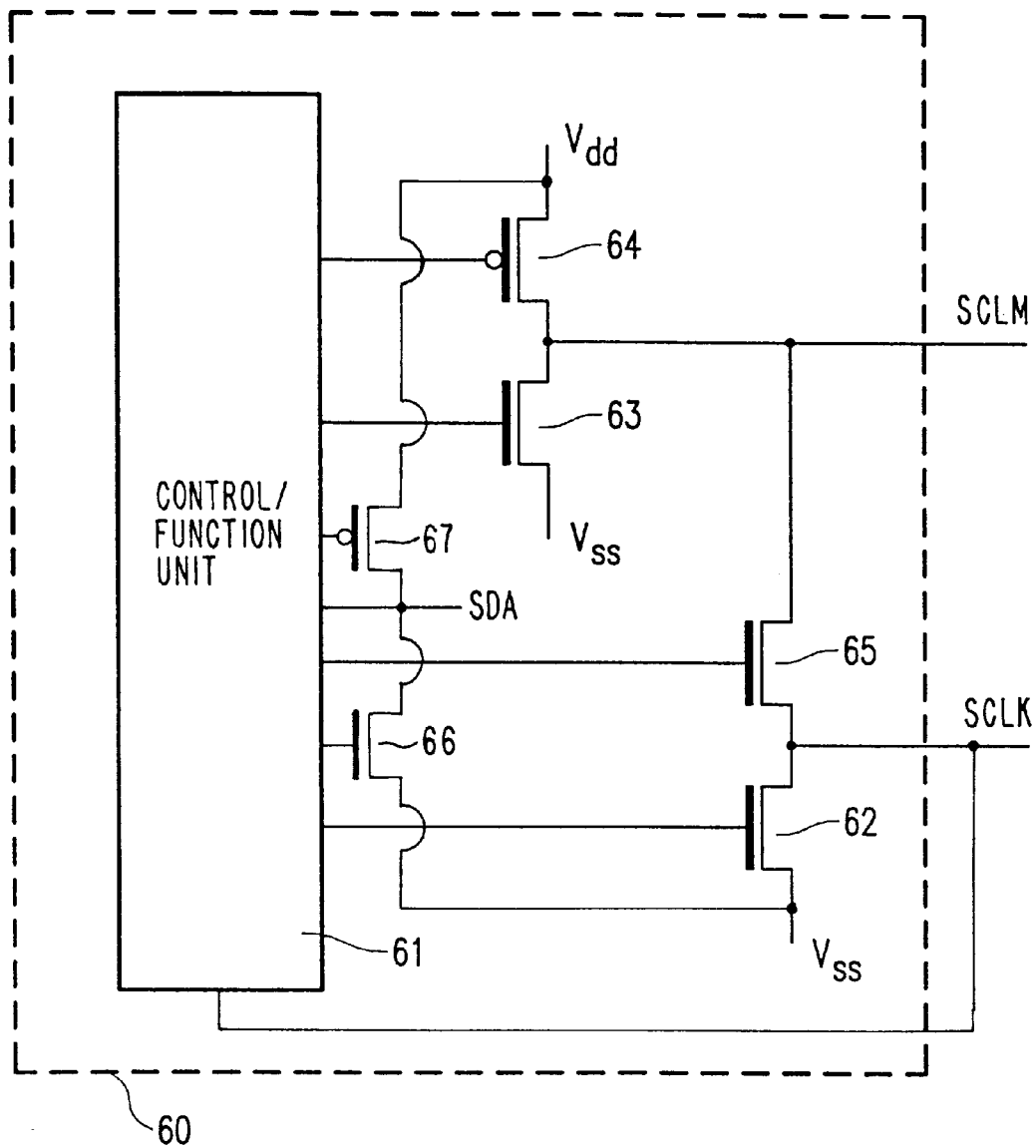
FIG. 6 shows an embodiment of a master station

FIG. 6 shows an embodiment of a master station 60 with an interface to the bus SDA SCLm, SCLk. The master station 60 contains a control/function unit 61. The master station 60 furthermore contains a first push-pull stage comprising a PMOS transistor 67 and an NMOS transistor 66 having their channels coupled in series between two power supply connections (Vdd and Vss). The control/function unit 61 has a coupling to each of the gates of the PMOS transistor 67 and NMOS transistor 66. A node between the PMOS transistor 67 and the NMOS transistor 66 is coupled to the datasignal conductor SDA and to an input of the control/function unit 61.

The master station 60 furthermore contains a second push-pull stage comprising a PMOS transistor 64 and an NMOS transistor 63 having their channels coupled 15 in series between two power supply connections. The control/function unit 61 has a coupling to each of the gates of the PMOS transistor 64 and NMOS transistor 63. A node between the PMOS transistor 64 and the NMOS transistor 63 is coupled to the second clock signal conductor SCLm for high speed clocking and to the control/function unit 61.

The master station 60 contains a pull-down NMOS transistor 62 with a channel coupled between one of the power supply connections (Vss) and the first clock signal conductor (SCLk) for low speed clocking. The control/function unit 61 has an output coupled to the gate of the pull-down NMOS transistor 62. The first clock signal conductor is coupled to an input of the control/function unit 61.

The master station 60 contains an NMOS pass transistor 65 having a channel coupled between the first clock signal conductor SCLk and the second clock signal conductor SCLm. A gate of the pass transistor 65 is coupled to the control/function unit 61.

In operation the control/function unit 61 monitors the bus SDA, SCLm, SCLk to detect whether a message is being sent or whether it is allowed to attempt to gain control of the bus SDA, SCLm, SCLk. If the master station 60 wants to send a message and it is allowed to gain control of the bus SDA, SCLm, SCLk, it signals a start condition by making the NMOS transistor 66 in the first push-pull stage conductive to pull down the potential of the datasignal conductor SDA. The PMOS transistor 67 in the first push-pull stage is kept non-conductive. The transistors 63, 64 in the second push-pull stage are kept non-conductive and the pull down transistor 62 is kept non-conductive, so that the potential on the clock signal conductors SCLk, SCLm may be kept high by pull-up resistors coupled to these conductors SCLk, SCLm. The control/function unit 61 may keep the pass transistor 65 conductive. Subsequently, during arbitration the control/function unit 61 uses the NMOS transistor 63 in the second push-pull stage and the pull-down transistor 62 to generate clock pulses on both clock signal conductors SCLm, SCLk. The NMOS transistor 66 of the first push-pull stage is used to put the code of the master station 60 on the datasignal conductor SDA. The PMOS transistors 64, 67 in the first and the second push-pull transistors are kept unconductive at this time.

During arbitration the control/function unit 61 monitors the bus SDA SCLk, SCLm to detect whether the master station 60 has gained control of the bus. When that has happened and the master station needs to transfer information over the bus with a high speed clock, the function/control unit 61 makes the pass transistor 65 unconductive and it makes the pull down transistor 62 unconductive.

The control/function unit then starts sending clock pulses via the second clock signal conductor SCLm, using both the NMOS transistor 63 and the PMOS transistor 64 of the second push pull stage. Use of both transistors 63, 64 makes it possible to generate shorter clock pulses than would be possible using only the NMOS transistor 63 and a pull-up resistor. Use of the PMOS transistor 64 is allowed because the master station 60 knows for certain that no other station will pull down the potential of the second clock signal conductor SCLm once the master station has finished the arbitration period. When the master transmits information to the slave, bits are written to the datasignal conductor SDA using both transistors 66, 67 of the first push-pull stage. This is allowed for the same reason as use of the second push-pull stage is allowed, and also makes transmission faster. When the slave station transmits information to the master station the slave station may use a similar push-pull stage as the master station.

The frequency of potential changes on the datasignal conductor needs to be only half that on the clock signal conductor. Therefore it is more important for maximum speed that the master uses push-pull to drive the clock signal conductor SCLm than that push-pull is used to drive the datasignal conductor. Because the clock signal conductors are separated at high speed the capacitive load of the clock output of the master station is reduced and the speed of the clock signal may be high. A similar reduction of the capacitive load of the datasignal conductor SDA is not needed because the signal on the datasignal conductor SDA changes more slowly, the datasignal conductor can therefore be kept unsplit. However, in order to reduce the risk of errors by slow stations due to high frequency transitions on the datasignal conductor, one may also split the datasignal conductor SDA in two sections, one section connected to the stations that are only connected to the one clocksignal conductor SCLk and the other section connected to the other stations. Between the two sections includes a bridge station which connects or isolates the two sections, depending on whether the bridge station detects from the arbitration that high speed transmission will occur.

After every eight bits the receiving station is allowed to acknowledge reception of those bits. For this purpose the master station each time puts a ninth clock pulse on the second clock signal conductor SCLm. The receiving station acknowledges by keeping the potential on the datasignal conductor SDA low during the ninth clock pulse. In an embodiment, the master station 60 may allow for the slower speed pull-up of the datasignal conductor SDA if no acknowledge is given, in this case the master station 60 makes the preacknowledge time interval between the eighth and the ninth clock pulse longer than the time intervals between the other clock pulses. This pre-acknowledge time interval is preferably at least twice as large as the other time intervals, which can easily be realized by skipping a clock pulse between the eighth clock pulses and the ninth clock pulse.

A master station as shown in FIG. 6 may also be used in an apparatus with only stations capable only of low speed transmission or only stations capable of high speed transmnission, in which case the first clock signal conductor SCLk or the second clock signal conductor SCLk, respectively will generally be omitted from the apparatus.

I claim:

1. An electronic apparatus comprising:

a plurality of stations;

a bus interconnecting the stations for exchange of a message satisfying a signal protocol, the message containing successively time division multiplexed a header signal, a content signal and a signal indicating completion of the message, the bus comprising a first and second section;

a bridge station interconnecting the first and second section;

at least one of the stations being arranged to transmit the content signal at a first clock speed greater than the clock speed of the header signal after giving an indication of transmission at said first clock speed by means of the header signal, the at least one station and a subset of the stations capable of receiving the message with the content signal at said first clock speed being connected to the bus via the first section, the bridge station being arranged to pass the header signal between the first and second section, to substitute a substitute signal independent of the content signal for the content signal on the second section of the bus in response to detecting said indication, and to resume passing signals between the first and second section in response to the signal indicating completion of the message, the header signal, the substitute signal, and the signals passed after the resumption together satisfying the signal protocol at a second clock speed lower than the first clock speed.

2. An electronic apparatus according to claim 1, wherein the stations are arranged to use the header for arbitration of bus access rights.

3. An electronic apparatus according to claim 1, wherein the stations are arranged to establish signals on the bus collectively as a wired logic function at least during the header signal, the bridge station passing a wired logic result established in the first section of the bus to the second section of the bus and vice versa during transmission of the header signal and after the resumption, the bridge station generating wired logic drive signals for the second section to drive the substitute signal on the second section.

4. An electronic apparatus according to claim 1, wherein:

the first section comprises at least a first and second signal conductor, and the second section comprises a third and fourth signal conductor, the signal protocol requiring that the completion of the message is indicated by a logic transition of a potential of the first and third signal conductors from a first to a second level with the potentials of the second and fourth signal conductors having a specified logic level, the bridge station keeping the third and fourth signal conductor at the first level and the specified logic level respectively during transmission of the content signal on the first section, the bridge station bringing the potential of the third signal conductor from the first level to the second level in response to detection of the logic transition of a potential of the first signal conductors from the first to the second level, with the potential of the second signal conductor at the specified logic level.

5. An electronic apparatus according to claim 4, wherein the potential of at least one of the third and fourth signal conductor is established by a wired logic function affectable by a further subset of the stations during transmission of the substitute signal, the bridge station monitoring the potential of at least one of the third and fourth signal conductor, the bridge station resuming the passing of signals between the first and second section in response to detection of a transition in said potential of the at least one of the third and fourth signal conductor.

6. An electronic apparatus according to claim 1, the at least one of the stations comprising a wired logic driving circuit and a push-pull driving circuit for driving the first section of the bus, the at least one of the stations driving the first section by means of the wired logic driving circuit during transmission of the header signal and after transmission of the signal indicating completion of the message, the at least one of the stations driving the first section by means of the push-pull driving circuit during transmission of the content signal.

7. An electronic apparatus according to claim 1, the first section comprising a clock signal conductor, the at least one of the stations driving the clock signal conductor by means of the wired logic driving circuit during transmission of the header signal and after transmission of the signal indicating completion of the message, the at least one of the stations driving the clock signal conductor by means of the push-pull driving circuit during transmission of the content signal.

8. An electronic apparatus according to claim 1, wherein at least one of the stations is capable of transmitting at least two types of header signals indicating transmission with and without the first clock speed respectively, the bridge station continuing to pass signals between the first and second section in response to the type of header signal indicating transmission without the first clock speed.

9. An electronic apparatus according to claim 1, wherein the at least one of the stations is arranged to transmit an address signal following the header signal and preceding the content signal at the first clock speed, each station of the subset responding selectively to the message, depending on whether the address signal matches an own address of the station.

10. An electronic apparatus according to claim 9, wherein the at least one of the stations is arranged to transmit a further address signal following the content signal and preceding a further content signal preceding the signal indication completion of the message, the further address signal and the further content signal being transmitted at the first clock speed, each station of the subset responding selectively to the further content signal, depending on whether the further address signal matches an own address of the station, the bridge station maintaining the substitute signal on the second section during transmission of the further address signal and the further content signal.

11. A bridge station with connections for a first and second section of a bus, arranged for use as the bridge station in the electronic apparatus according to claim 1.

* * * * *